United States Patent [19]

Kajimura et al.

[11] Patent Number: 5,245,863
[45] Date of Patent: Sep. 21, 1993

[54] ATOMIC PROBE MICROSCOPE

[75] Inventors: Hiroshi Kajimura, Tokyo; Takao Okada, Hachioji, both of Japan

[73] Assignee: Olympus Optical Co., Ltd., Tokyo, Japan

[21] Appl. No.: 724,145

[22] Filed: Jul. 1, 1991

[30] Foreign Application Priority Data

Jul. 11, 1990 [JP] Japan .................................. 2-181469
Jul. 20, 1990 [JP] Japan .................................. 2-191988

[51] Int. Cl.$^5$ ...................... G01B 7/34; G01B 11/30
[52] U.S. Cl. ..................................... 73/105; 250/306; 356/376
[58] Field of Search .............. 73/105; 356/376; 382/1, 382/8; 250/306, 307

[56] References Cited

U.S. PATENT DOCUMENTS

| | | | |
|---|---|---|---|
| 4,604,520 | 8/1986 | Pohl | 359/894 X |
| 4,866,271 | 9/1989 | Ono et al. | 250/306 |
| 4,935,634 | 6/1990 | Hansma et al. | 250/306 X |
| 5,025,658 | 6/1991 | Elings et al. | 73/105 |
| 5,157,251 | 10/1992 | Albrecht et al. | 250/307 X |
| 5,164,791 | 11/1992 | Kubo et al. | 250/306 X |

OTHER PUBLICATIONS

Physical Review Letters, vol. 56, No. 9, Mar. 3, 1986, Atomic Force Microscope, G. Binnig et al., pp. 930–933.
Physical Review Letters, vol. 49, No. 1, Jul. 5, 1982, Surface Studies by Scanning Tunneling Microscope, G. Binning et al., pp. 57–61.
Proceedings of the IEEE, vol. 70, No. 5, May, 1982, Silicon as a Mechanical Material, Kurt E. Petersen, pp. 420–457.
Applied Optics/vol. 29, No. 1, Jan. 1, 1990—pp. 16–18 "Fiber optic displacement sensor with subangstrom resolution"; S. Breen et al.
Applied Optics/vol. 28, No. 20, Oct. 15, 1989—pp. 4251 & 4487 "NASA Patter"; Charles Braun.

Primary Examiner—Tom Noland
Attorney, Agent, or Firm—Frishauf, Holtz, Goodman & Woodward

[57] ABSTRACT

A cantilever has a probe on one side of the end portion and a mirror on the opposite side. The cantilever is fixed to a support member via a piezoelectric element. A semiconductor laser situated above the mirror has a reflection cleavage plane and constitutes a Fabry-Pérot resonator between the mirror and the reflection cleavage plane. The output from the resonator varies in accordance with the amount of displacement of the end portion of the cantilever, that is, the surface configuration of the sample. This variation is detected by a detector via a photodetector. A control circuit controls a driving voltage applied to an XYZ-scanner so as to cancel the variation of the output from the resonator, thereby keeping constant the distance between the tip of the probe and the surface of the sample. The driving voltage provides height data of the sample surface. The driving voltage, along with a position signal relating to the sample surface output from the XYZ-scanner, is supplied to an image forming unit. The image forming unit generates a three-dimensional image representing the surface configuration of the sample, on the basis of the input voltage and signal.

26 Claims, 10 Drawing Sheets

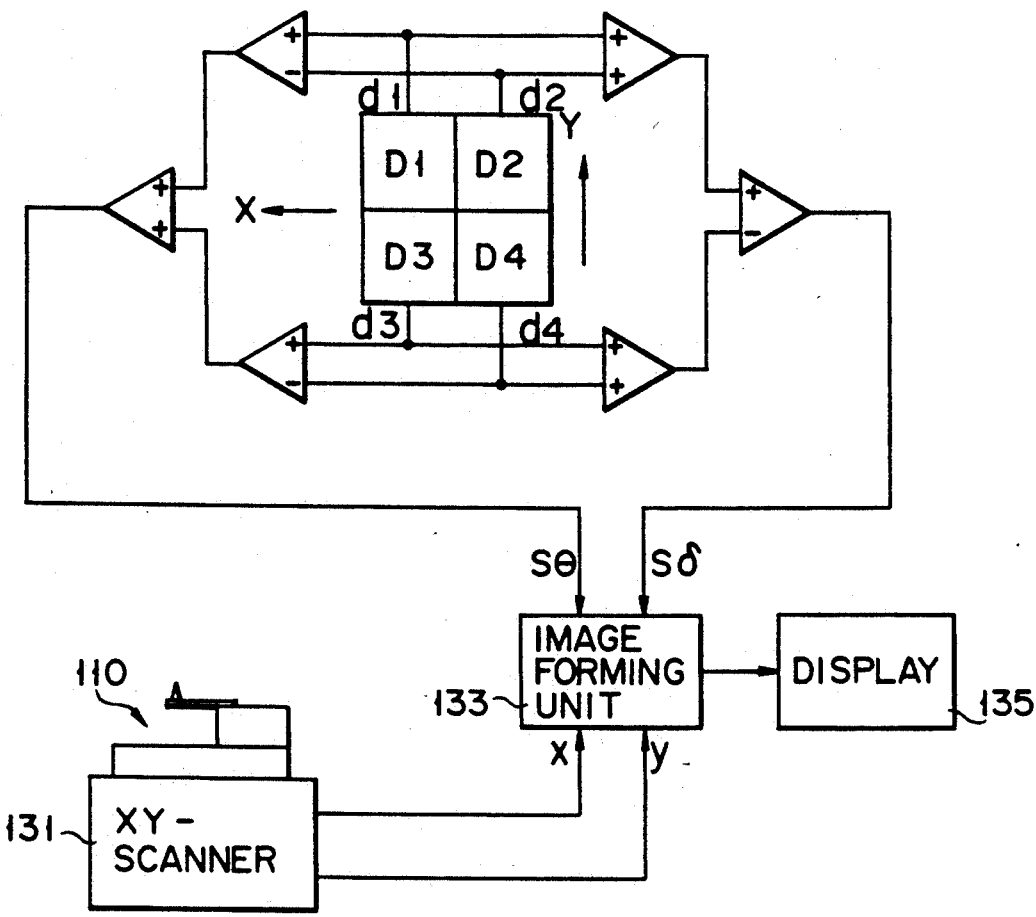
F I G. 15
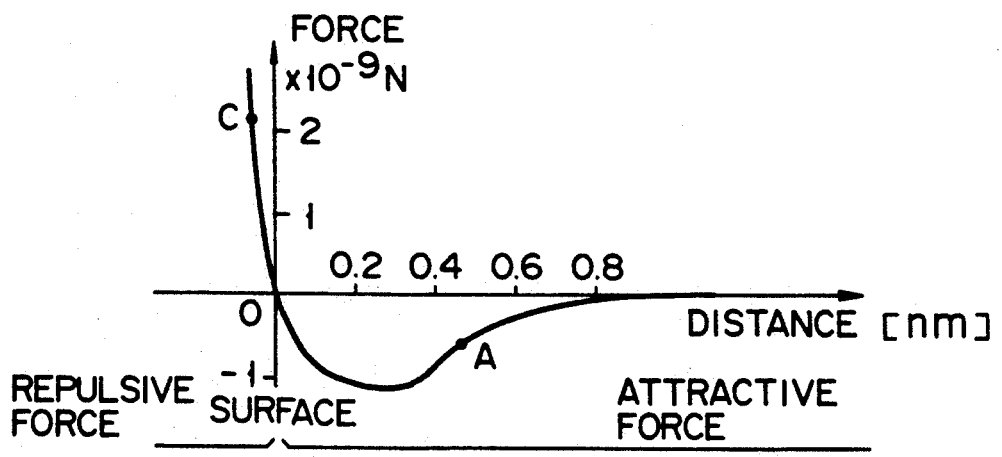
F I G. 16

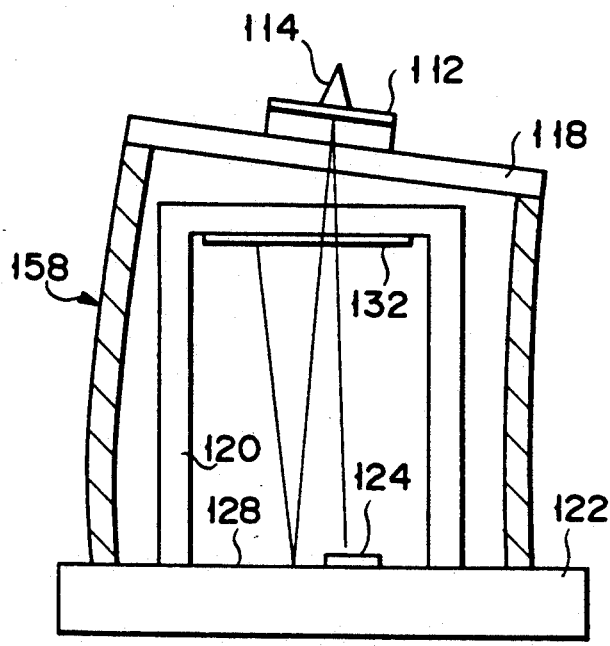
F I G. 21
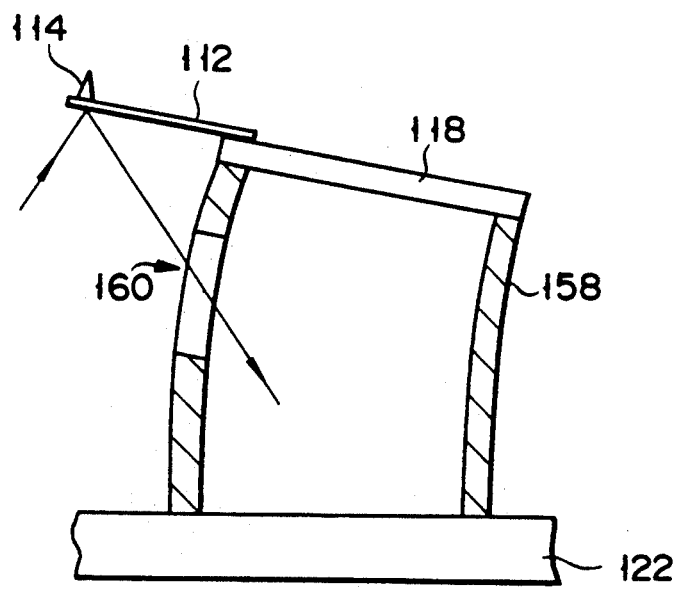
F I G. 22

ATOMIC PROBE MICROSCOPE

BACKGROUND OF THE INVENTION

1. Field of the Invention

The present invention relates to an atomic probe microscope for observing a fine surface configuration of a sample, using a pointed probe.

2. Description of the Related Art

Atomic probe microscopes include a scanning tunneling microscope (STM), an atomic force microscope (AFM) and a magnetic force microscope (MFM).

The STM was proposed in 1982 by Binnig, Rohrer, et al. It can observe a surface configuration of an electrically conductive sample on the atomic order. The STM is described in detail in "Surface Studies by Scanning Tunneling Microscope", G. Binnig, H. Rohrer, Ch. Gerber and E. Weibel, Physical Review Letters, Vol. 49, 57 (1982). The STM has an electrically conductive probe which is supported in the vicinity of the surface of an electrically conductive sample. The probe tip is approached to the sample surface at a distance of 1 nm. A voltage is applied across the probe and the sample, thereby causing a tunnel current to flow therebetween. The tunnel current varies depending on the distance between the probe and the sample. If the distance varies by 0.1 nm, the current increases about ten times or decreases to about one tenth. In the observation, the probe is moved along the sample surface (e.g. "raster scan"). While the probe is being moved, the distance between the probe tip and the sample surface is controlled using a finely movable element such as a piezoelectric element, so as to keep the intensity of the tunnel current between the probe and sample at a constant value. Thus, the distance between the probe and sample is kept constant, and the locus of the probe tip creates a curved surface that is parallel to the sample surface and representative of the surface configuration of the sample. Accordingly, a three-dimensional image representing the sample surface is formed on the basis of positional data relating to the probe tip which is calculated from the voltage applied to the piezoelectric element.

On the other hand, the atomic force microscope (AFM) is proposed as an apparatus capable of observing the surface configuration of an insulative sample in the atomic order. It is described in detail in "Atomic Force Microscope", G. Binnig, C. F. Quate, Physical Review Letters, Vol. 56, 930 (1986). In the AFM, the probe is supported by a soft cantilever. When the probe is moved close to the sample surface, a van der Waals attractive force acts between an atom at the tip of the probe and an atom on the sample surface. Then, if both atoms move close to each other so as to nearly contact, a repulsive force occurs therebetween due to the Pauli exclusion principle. The attractive force and repulsive force (between atoms) are very weak and about $10^{-7}$ to $10^{-12}$ [N]. In general, when observation is effected with an atomic force microscope, the probe can approach the sample surface to such a distance that the cantilever is somewhat displaced owing to the inter-atomic force exerted on the atom at the probe tip. If the probe is scanned along the sample surface from this state, the distance between the probe and the sample varies in accordance with the configuration of the sample surface and, accordingly, the amount of displacement of the cantilever varies. The variation in displacement of the cantilever is detected, and feedback control is effected by use of a fine movement element such as a piezoelectric element so as to the amount of displacement of the cantilever to the initial value. As a result, the probe tip moves while describing a curved plane in parallel to the sample surface. On the basis of the applied voltage in the piezoelectric element, an image of the surface configuration of the sample can be obtained.

The MFM (magnetic force microscope) has a probe made of a magnetic material. The other structural features of the MFM are basically identical to those of the atomic force microscope (AFM). Like the AFM, the probe of the MFM is scanned along the sample surface while a magnetic force acting between a magnetic particles of the probe and the sample is kept constant, thereby obtaining an image of the surface configuration of the sample.

The cantilever employed in the AFM or MFM should desirably be formed in an elongated shape of a material having a light weight and a high elastic coefficient, since the cantilever needs to be displaced with high responsiveness to a weak force (inter-atomic force or magnetic force). However, if the length of the cantilever increases, the characteristic frequency decreases. As a result, the responsiveness to the surface configuration of the sample at the scan time is degraded, and the removal of external vibration noise becomes difficult. Generally, the length of the cantilever is limited to 1000 μm or less and the characteristic frequency is set to about 10 to 100 KHz. Thus, the amount of displacement of the cantilever is limited, and high sensitivity to the displacement is required.

According to a method of detecting displacement of such a cantilever, an STM is constituted on the rear face (the face on which the probe is not provided) of the cantilever, and displacement of the cantilever is detected as a variation of tunnel current. In this case, if the cantilever is electrically conductive, no special treatment is required; however, if it is electrically insulative, the surface of the cantilever is coated with an electrically conductive material, for example, by means of deposition. The STM has sufficient sensitivity to the distance between the probe and the cantilever. However, since an inter-atomic force acts between the probe and the cantilever, exact measurement cannot be carried out.

According to another method, an optical reflecting surface is provided on the rear face of the end portion of the cantilever, a beam from a ruby solid laser or an argon gas laser is made incident on the reflecting surface, and a reflection angle varying in accordance with displacement of the cantilever is detected by a PSD (light position detector). In this method, however, if the incidence angle of the beam is increased to enhance sensitivity, the size of the apparatus increases. Consequently, the characteristic frequency decreases and the sensitivity decreases. In addition, the beam incident on the cantilever surface has a width, and, in order to enhance the resolution of the reflection angle, the flatness of the reflecting surface must be improved. This is not easy, however.

According to still another method, the light emitted from the laser is divided into a reference beam and a detection beam. The detection beam is radiated on the optical reflection surface formed on the rear of the end portion of the cantilever. A reflected beam from the reflection surface is caused to interfere with the reference beam, and an interference output is photoelectrically detected. In order to obtain good sensitivity, the light path length of the reference beam system must be equalized to that of the detection beam system, so as to cancel ambient influence (variation in temperature, atmospheric pressure, etc.). This makes the apparatus complex. If the reference beam system and the detection beam system are formed separately, it is difficult to equalize the characteristic frequencies of the respective light paths. Thus, the sensitivity is deteriorated owing to ambient influence.

According the atomic probe microscope, the probe is moved relative to the sample surface, in order to measure the sample surface configuration. During the movement, the probe is servo-controlled in the z-direction vertical to the sample surface, so as to keep the distance between the probe and the sample constant.

In the STM, the servo control of the probe is carried out by feed-back controlling the z-axial position of the probe so as to keep constant the tunnel current flowing between the probe and the conductive sample. Thus, if dust is on the sample surface or part of the sample surface is coated with an oxide film, the probe approaches the sample while removing the dust or oxide film.

In either the AFM or the STM, the probe moves along the sample surface. If oxide film or dust exists above the tip of the probe, the probe suffers a shearing force in the x- or y-direction. Consequently, there occurs an error between the actual position of the probe tip and the position found on the basis of the voltage applied to the piezoelectric element for finely moving the probe.

SUMMARY OF THE INVENTION

The object of the present invention is to provide an atomic probe microscope having a small-sized detection system capable of detecting a displacement of a cantilever due to a weak force, with high sensitivity and high stability to ambient influence.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 15 is a block diagram for illustrating the information processing in the fifth embodiment;

FIG. 16 is a graph showing the relationship between the probe/sample distance and the inter-atomic force acting between the probe and sample;

FIG. 21 and FIG. 22 show an eighth embodiment of the atomic probe microscope of the present invention.

DETAILED DESCRIPTION OF THE PREFERRED EMBODIMENTS

Embodiments of the atomic probe microscope according to the present invention will now be described with reference to the accompanying drawings.

Figure 1:
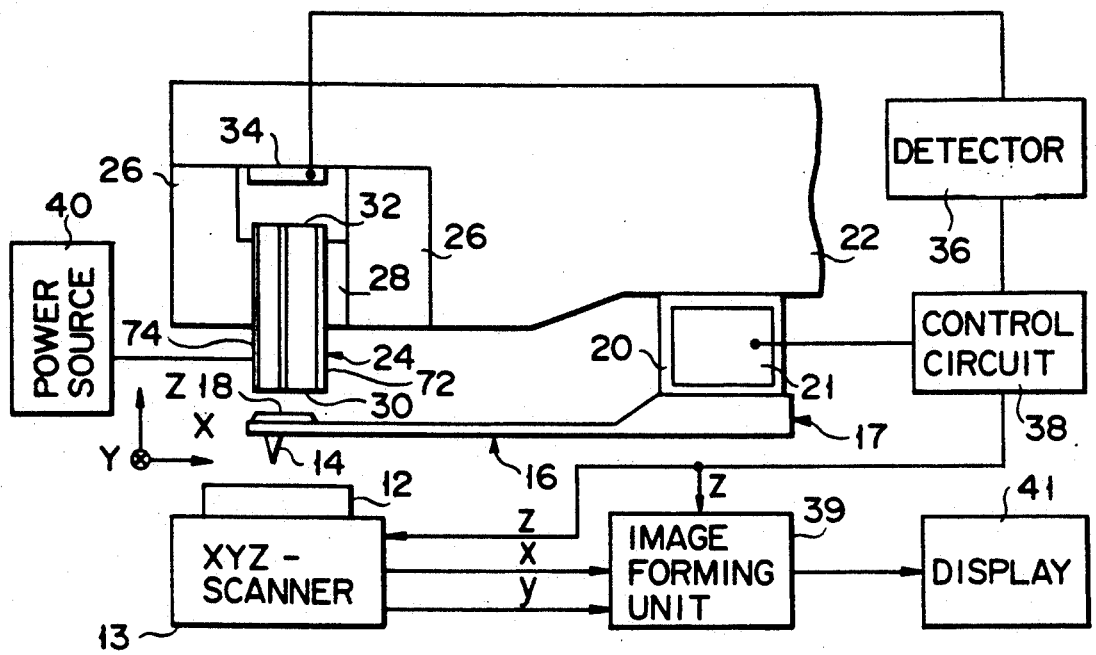
FIG. 1 shows a first embodiment of an atomic probe microscope according to the present invention.

A first embodiment will now be described with reference to FIGS. 1 to 6. As is shown in FIG. 1, the microscope of the first embodiment has a cantilever 16 having at its end a probe 14 for scanning the surface of a sample 12. The cantilever 16 has a lever portion made of $SiO_2$ (or $Si_3N_4$) with a length of 500 to 2000 $\mu$m, a thickness of 5 $\mu$m and a width of 200 $\mu$m. This type of cantilever 16 is manufactured on the basis of a semiconductor processing technique called "microfabrication" or "micromachining". For example, this technique is described in Kurt T. Peterson, "Silicon as a Mechanical Material", Proceedings of the IEEE Vol. 70, No. 5 PP. 420-457, May, 1982.

The cantilever 16 has a mirror 18 on the upper surface of the end portion thereof. The mirror 18 is formed by depositing Au or Al. A support portion 17 of the cantilever 16 has a firm structure to withstand the attachment thereof to the microscope body and the exchange thereof. For example, that portion of the substrate which has not been processed by the microfabrication is used as the support portion. The support portion of the cantilever 16 is fixed to a support member 22 of silicon or Pyrex via a piezoelectric element 20 of PZT. The piezoelectric element 20 has mutually facing two electrodes 21 (only one is shown). In accordance with the voltage applied to the electrodes, the cantilever 16 is moved in the z-direction. A semiconductor laser 24 is situated above the mirror 18. The semiconductor laser 24 has mutually facing two electrodes 72 and 74. One electrode 74 is directly attached to a heat sink member 26 of, e.g. copper provided on the support member 22. The other 72 is attached to the heat sink member 26 via a silicone rubber 28. The semiconductor laser 24 has a double-hetero structure, and should desirably generate a low output with a low threshold.

Figure 2:
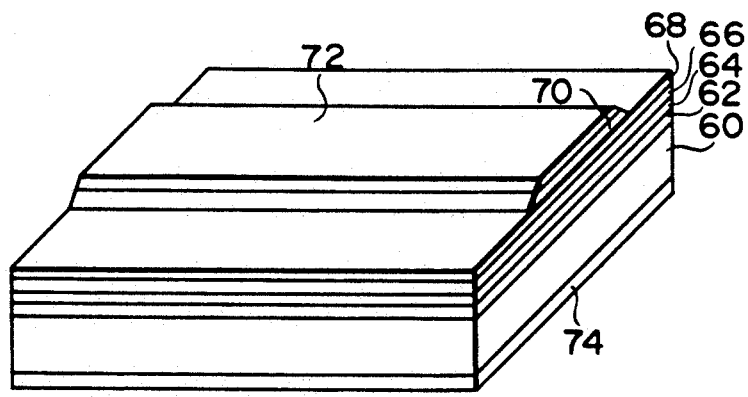
FIG. 2 is a perspective view of a semiconductor laser shown in FIG. 1.

A general semiconductor laser will now be described. FIG. 2 shows a semiconductor laser of a double-hetero structure. As shown in FIG. 2, on the (001) plane of an n-type GaAs substrate 60, the following layers are laminated successively: an n-type GaAs buffer layer 62, an n-type $Al_{0.5}Ga_{0.5}As_{0.5}$ clad layer 64, a p-type $A_{0.15}Ga_{0.85}As$ active layer 66, a p-type $Al_{0.5}Ga_{0.5}As$ clad layer 68, and a strip-like n-type GaAs blocking layer 70. These layers are formed, for example, by epitaxial growth. A strip-like p-type ohmic electrode 72 is provided in contact with the blocking layer 70. An n-type ohmic electrode 74 is provided in contact with the n-type GaAs substrate.

The semiconductor laser has two parallel planes of cleavage ((110) planes) with a distance of 100 to 300 μm. A Fabry-Pérot type resonator is formed between the cleavage planes (reflecting planes). When a voltage exceeding a threshold is applied to the ohmic electrodes, light is emitted by re-coupling of injected electrons. The light travels reciprocally between the two parallel reflecting surfaces. While the light is amplified by stimulated emission, part of the light going back to the reflecting surfaces is absorbed (absorption loss). The lost light and the power due to stimulated emission are balanced, and oscillation starts. The light reciprocating in the laser resonator generates a standing wave having a face in parallel to and in phase with the reflecting surfaces. An output is obtained by partial light transmission through the reflecting surface. In a laser resonator having a resonator length greater than wavelength, a number of slightly different wavelengths can be resonated.

Figure 3:
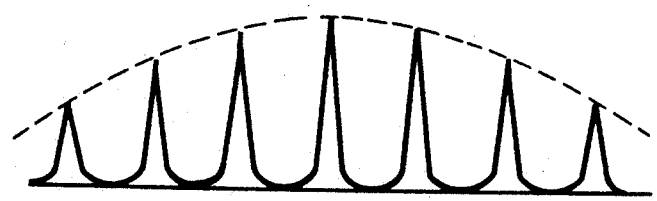
FIG. 3 shows a spectrum of a plurality of standing waves in a laser resonator.
Figure 4:
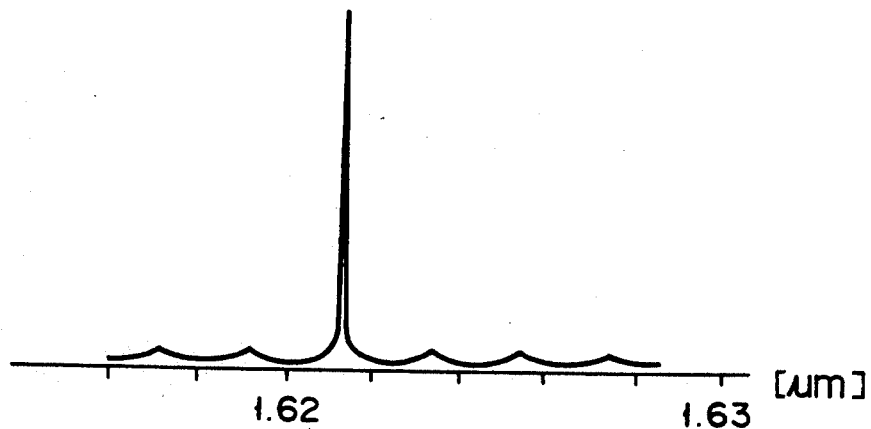
FIG. 4 shows an oscillation spectrum of a single-mode laser.
Figure 5:
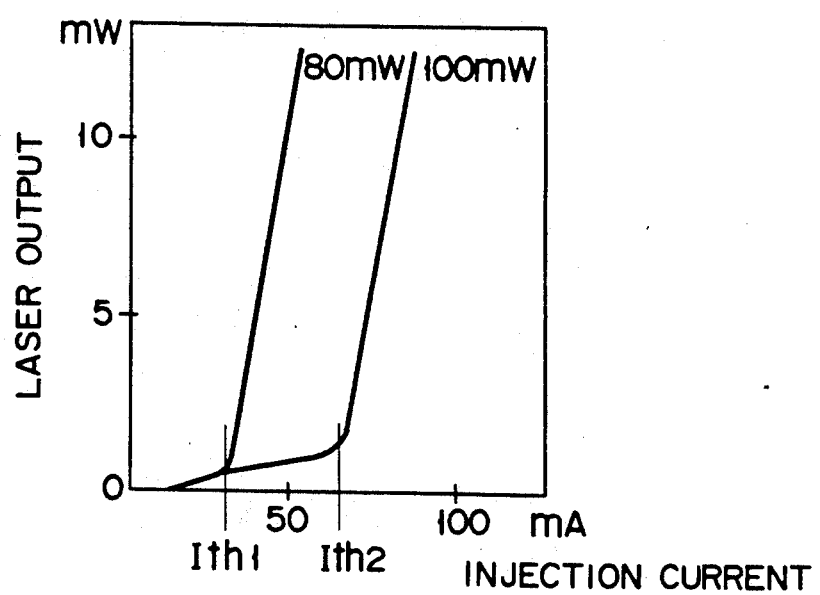
FIG. 5 shows an injection current/output characteristic of a semiconductor laser.

FIG. 3 shows a spectrum of standing waves in the laser resonator. The length L of the laser resonator is given by $L = q\lambda/2n_{eq}$ (q=an integer), where $\lambda$=wavelength of light, and $n_{eq}$=an equivalent refractive index of a waveguide. When $\lambda = 0.85$ μm, $n_{eq} = 3.5$ and $L = 300$ μm, the standing wave has a node of $q = 2470^{-1}$. Suppose that a current not lower than a threshold ($I_{th1}$, $I_{th2}$) of an injection current/output characteristic shown in FIG. 5 is applied to a double-hetero structure semiconductor laser with a narrow active layer and reduced horizontal/lateral mode oscillation. In this case, as shown in FIG. 4, the laser functions as a single-mode laser oscillating only at a center spectrum. The width of this spectrum is very small and, e.g. about ⅓ to 1/6 of the vertical mode distance $\Delta\mu$ (0.3 to 2 nm). The output is abruptly decreases y a wavelength shift of about 0.2 to 0.8 Å.

A typical laser used for optical communication is a distribution feedback type (DFB) laser in which a grating is provided in an active region or a distribution reflection type (DBR) laser in which a grating is provided on either side or both sides of an active region. These lasers are employed in consideration of light distribution in fibers, and they can perform a stable single-mode oscillation. In this type of laser, the oscillation wavelength is determined by the cycle of the grating; therefore, a single-mode oscillation can stably be carried out. In a semiconductor laser for communication, a high electric current is injected to obtain a high output. Consequently, a large quantity of energy is converted to heat, and not to light, resulting in an increase in temperature of the laser. In the Fabry-Pérot mode, the refractive index of the active region varies owing to the temperature increase, and the wavelength varies at a rate of 0.6 to 0.8 Å/deg. in a GaAs/AlGaAs laser and at a rate of 1.0 Å/deg. in a GaInAsP/InP laser. Thus, the laser is unstable when the output power is increased.

In the semiconductor laser 24 according to the present embodiment, the cleavage plane (transmissive cleavage plane) 30, which is closer to the mirror 18, is coated with an anti-reflection (AR) film of $SiO_2$ or $Si_3N_4$, and the cleavage plane (reflection cleavage plane) 32, which is distant from the mirror 18, is coated with an $Al_2O_3$ film. These cleavage planes 30 and 32 and mirror 18 are arranged parallel, and a Fabry-Pérot resonator is constituted by the mirror 18, reflection cleavage plane 32 and the waveguide. When an electric current exceeding a threshold is injected in the resonator, a laser beam having a predetermined frequency is output from the reflection cleavage plane 32. A photodetector 34 for detecting a laser beam emitted from the laser 24 is situated above the reflection cleavage plane 32. The photodetector 34 is, for example, a high-sensitivity PIN photodiode made of a material having a sensitivity corresponding to the wavelength of the laser beam.

Figure 6:
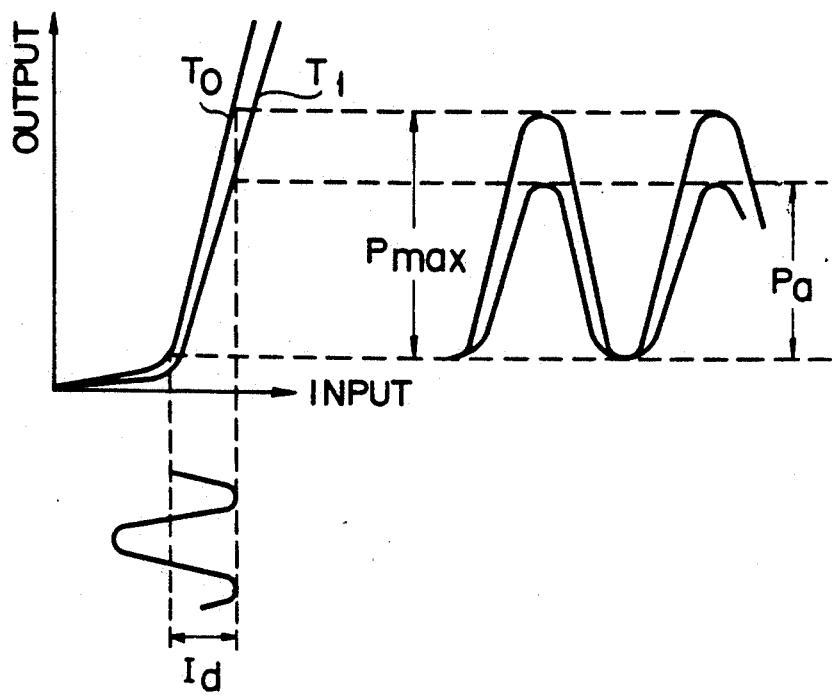
FIG. 6 shows an output characteristic of a Fabry-Pérot resonator constituted between a mirror and a reflection cleavage plane shown in FIG. 1.

When no force is exerted on the probe 14, the mirror 18 is situated parallel to the reflection cleavage plane 32, and the resonator exhibits an output characteristic $T_0$ in FIG. 6. When an electric current having an amplitude $I_d$ and a frequency $f_d$ is supplied from a power source 40 to the laser 24, a laser beam having a maximum amplitude $P_{max}$ is detected by the photodetector 34. When the probe 14 approaches the sample 12, an inter-atomic force acts therebetween. In this case, the tip portion of the cantilever 16 moves towards the semiconductor laser 24, and the mirror 18 and reflection cleavage plane 32 becomes nbn-parallel. Thus, the quantity of light confined in the resonator decreases. As a result, the effective output characteristic varies as shown by curve $T_1$ in FIG. 6, and the maximum amplitude of the laser beam detected by the photodetector 34 decreases from $P_{max}$ to $P_a$. Accordingly, the photodetector 34 generates a signal corresponding to the inter-atomic force acting between the probe 14 and the sample 12, i.e. the displacement (warp) of the cantilever 16. The variation in amplitude (output) of the laser beam can be detected by monitoring the excitation current by means of a current monitor element provided within the semiconductor laser. The monitor element employed here is one of two semiconductor lasers connected in series, or diode detectors juxtaposed on a semiconductor substrate.

Prior to measurement, the inter-atomic force acting between the probe 14 and the sample 12 is set to be an attractive force $F_{attractive} = F_{a0}$ or a repulsive force $F_{repulsive} = F_{r0}$, depending on the type of the sample. The cantilever 16 is displaced by the set inter-atomic force. The voltage applied to the piezoelectric element 20 is controlled by a control circuit 38 so as to obtain a predetermined output amplitude $P_a$, whereby the distance between the mirror 18 and the reflection cleavage plane 32 is adjusted.

In the measurement, the probe 14 is approached to the sample 12 by a Z-drive device (not shown). The Z-drive device is stopped at the position where the above predetermined output amplitude $P_a$ is obtained.

In this state, the probe 14 and the sample 12 are moved relative to each other by conventional XYZ-scanner 13 (e.g. a cylindrical scanner), whereby the probe 14 scans the surface (XY-surface) of the sample. Then, the distance between the probe 14 and sample 12 varies in accordance with the sample surface configuration, and the output from the photodetector 34 varies. The output from the photodetector 34 is input to a detector 36 so that the variation in the output from the photodetector 34 is detected. A predetermined servo voltage is supplied from the control circuit 38 to XYZ-scanner 13 so as to cancel the variation in the output from the photodetector 34. During the scanning, the voltage applied to XYZ-scanner 13 is generated by the control circuit 38. The output signal (z-signal) from the control circuit 38, which represents the height data of the sample surface, is supplied to an image forming unit. The image forming unit 39 processes the height data (z-signal) relating to the sample surface and positional signals (x-signal and y-signal) representing the position of the sample surface output from the XYZ-scanner 13. The image forming unit 39 thus generates a three-dimensional image of the sample surface configuration. The image is displayed on a display 41.

Figure 7:
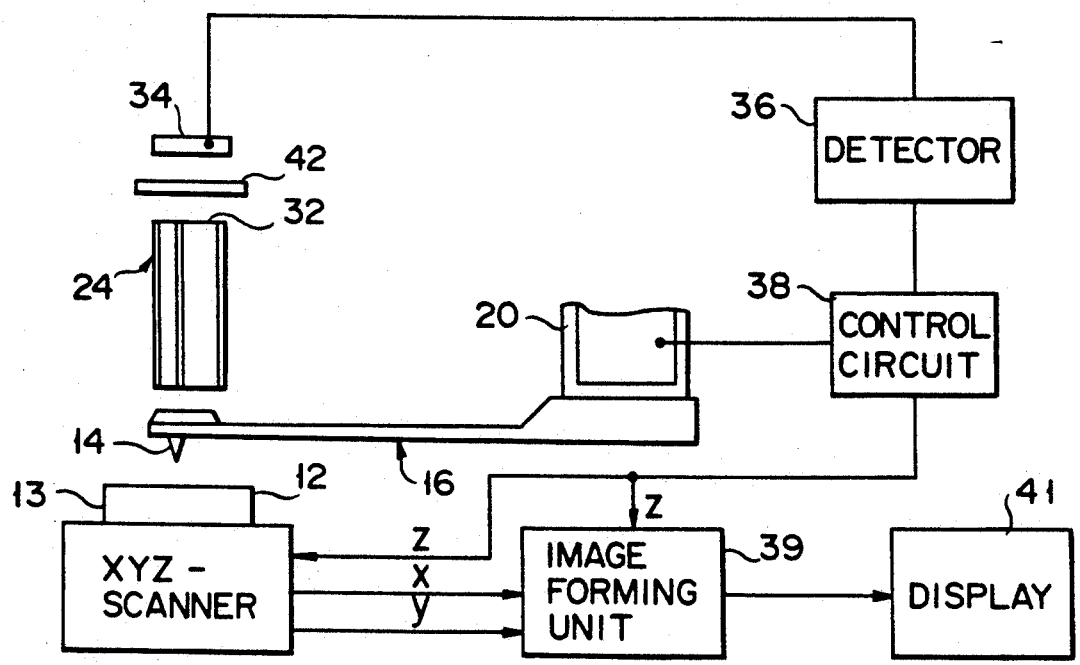
FIG. 7 shows schematically a second embodiment of the atomic probe microscope according to the invention.

FIG. 7 shows a schematic a second embodiment of the invention. The structure of the second embodiment is substantially identical to that of the first embodiment, except that an etalon 42 adjusted to selectively transmit a laser wavelength $\lambda_0$ is disposed between the reflection cleavage plane 32 and the detector 34.

The etalon 42 is known as a wavelength selecting filter. The etalon 42 comprises two mirrors with an equal reflectance, which are precisely arranged in parallel. As the reflectance becomes closer to 100%, the intensity of transmitted light decreases. The wavelength of transmitted light is controlled by the incidence angle of the etalon. The etalon 42 may be constructed by laminating vapor-deposition thin films.

Figure 8:
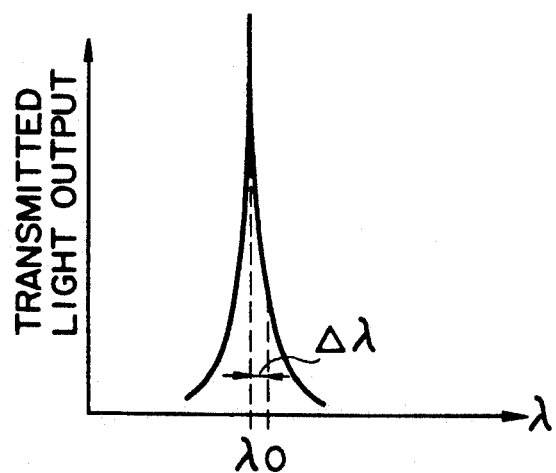
FIG. 8 shows a wavelength selectability of an etalon shown in FIG. 7.

The apparatus of this embodiment is suitable in the case where the inter-atomic force acting between the probe 14 and the sample 12 is an attractive force weaker than a repulsive force. In other words, if the interatomic force between the probe 14 and sample 12 is the attractive force, the variation in the distance between the probe and sample is small relative to the variation in the inter-atomic force; thus, the displacement of the cantilever 16 is small, compared to the case of repulsive force. Accordingly, the parallelism of the mirror 18 and reflection cleavage plane 32 is not greatly lost, and the variation of the laser output characteristic is small. However, the etalon 42 has a steep wavelength selection characteristic, as shown in FIG. 8 Thus, when the mirror 18 and reflection cleavage plane 32 are in parallel, the light of wavelength $\lambda_0$ passes through with no substantial attenuation. However, if the wavelength is displaced from $\lambda_0$, the intensity of transmitted light is suddenly decreased. Thus, in the case where the parallelism of the mirror 18 and reflection cleavage plane 32 is not greatly lost, the displacement of the cantilever 16 can be detected by the photodetector 34 with adequate precision. Like in the first embodiment, the output from the photodetector 34 is supplied to the control circuit 38 via the detector 36. Thus, the distance between the probe tip and the sample surface is controlled, and an image of the sample surface configuration is formed by the image forming unit 39 on the basis of the output signal (z-signal) from the control circuit 38 and the output signal (x-signal and y-signal) from the XYZ-scanner 13. The formed image is fed to the display 41.

Figure 9:
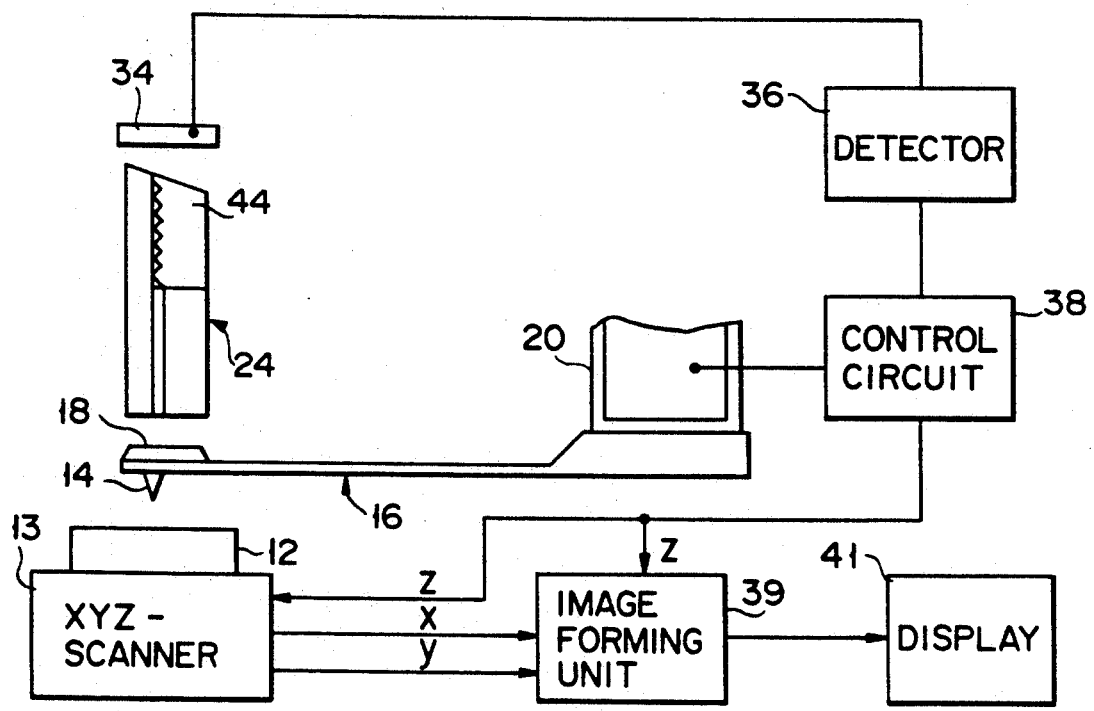
FIG. 9 shows schematically a third embodiment of the atomic probe microscope according to the invention.

A third embodiment of the invention will now be described. As shown in FIG. 9, in the third embodiment, the reflection cleavage plane 32 of the semiconductor laser 24 in FIG. 1 is replaced by a Bragg grating 44.

In a semiconductor laser, a Fabry-Pérot reflection mirror comprising two cleavage planes is a wavelength selecting filter. If a cyclic structure (Bragg grating 44) of a pitch (P) less than the distance (L) between both cleavage planes is provided along the light path, the refractive index of the waveguide is modulated periodically and equivalently. Only that portion of the transmitted light, which has a wavelength tuned to the pitch (P) of the Bragg wavelength, is reflected in a direction reverse to the light advancing direction, on the same principle that electron waves are scattered in a crystal. Thus, there can be obtained a reflection element or transmission filter having a spectrum width less than in the case of Fabry-Pérot interference. The reflectance (transmissivity) of the reflection element is determined by the cut angle.

Like the etalon 42 of the second embodiment, the Bragg grating 44 has a steep wavelength selection characteristic and constitutes a reflection mirror having a predetermined reflectance. Thus, an atomic force microscope suitable for the case where an attractive force acts between the probe 14 and the sample 12 is constituted. The operation of this microscope has been described in connection with the second embodiment, and a description thereof may be omitted here.

Figure 10:
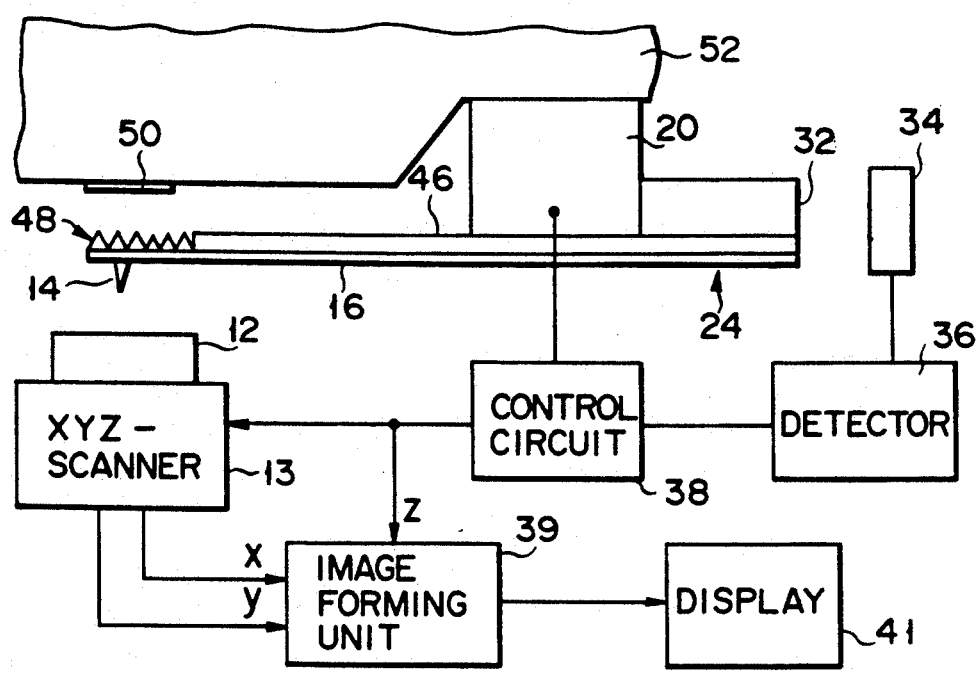
FIG. 10 shows a fourth embodiment of the atomic probe microscope according to the invention.

FIG. 10 shows the structure of a fourth embodiment of the invention. In the fourth embodiment, the semiconductor laser 24 is provided at the end portion of the cantilever 16. The cantilever 16 comprises a waveguide 46 for guiding light from the laser 24 to the tip portion, and a conventional grating reflection element 48 for vertically reflecting light from the waveguide 46. A mirror 50 is situated parallel to the grating reflection element 48. The mirror 50 is provided on a support 52 for supporting the piezoelectric element 20.

Light from the semiconductor laser 24 travels through the waveguide 46 and reaches the grating reflection element 48. The light is reflected by the reflection element 48 and directed to the mirror 50. The distance between the element 48 and 50 is about several $\mu$m. The mirror 50 reflects the light once again. The light from the mirror 50 travels through the grating reflection element 48 and waveguide 46 to the reflection cleavage plane 32. As a result, a Fabry-Pérot resonator is constituted between the reflection cleavage plane 32 and the mirror 50. The photodetector 34 detects the displacement of the probe 14 as a variation in intensity of light emitted from the reflection cleavage plane 32. As in the first embodiment, the output from the photodetector 34 is input to the control circuit 38 via the detector 36. Thus, the distance between the probe tip and the sample surface is controlled, and, on the basis of the output signal (z-signal) from the control circuit 38 and the output signal (x-signal and y-signal) from the XYZ-scanner 13, the image forming unit 39 generates an image of the sample surface. The image is fed to the display 41.

Figure 11:
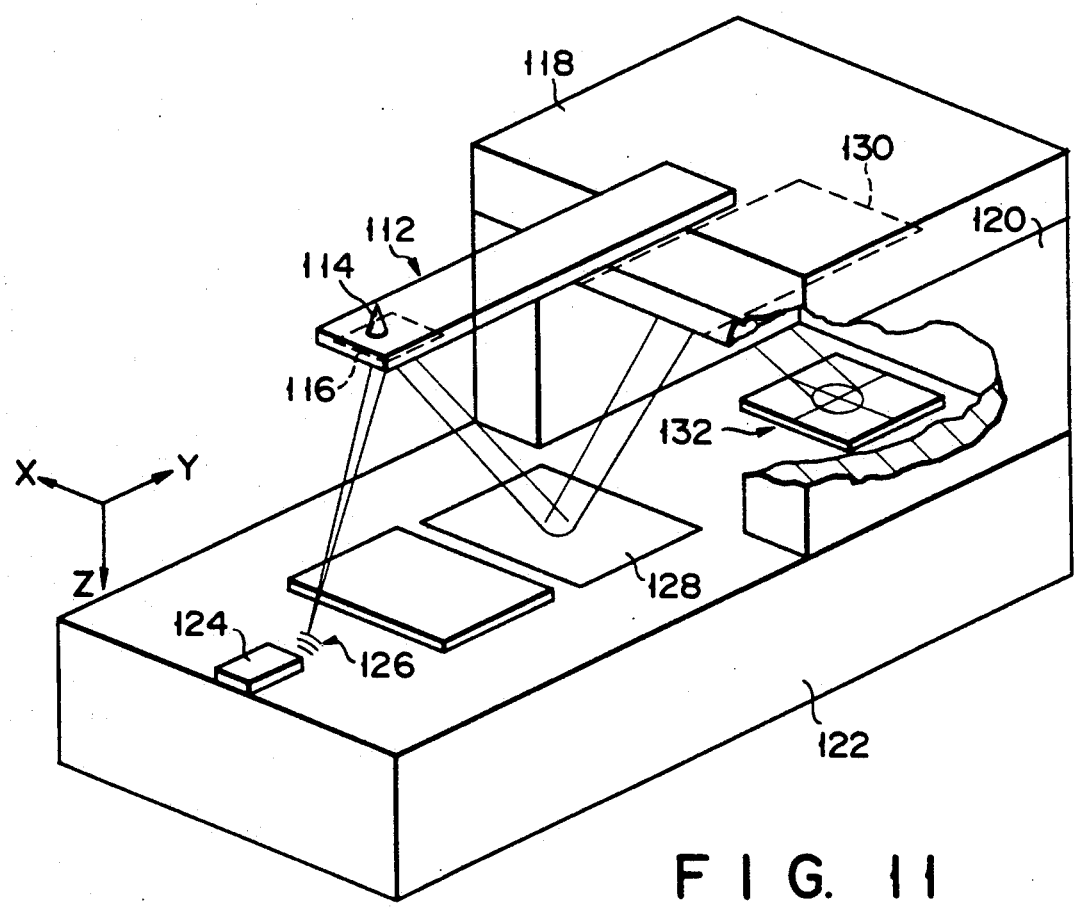
FIG. 11 shows a fifth embodiment of the atomic probe microscope according to the invention.

Next, a fifth embodiment of the atomic probe microscope of this invention will be described. As is shown in FIG. 11, a cantilever 112 comprises a probe 114 and a mirror 116, respectively, on the upper and lower surfaces of the tip end portion thereof. The other end portion of the cantilever 112 is fixed to an upper silicon substrate 118. The upper silicon substrate 118 is fixed to a lower silicon substrate 122 via an intermediate block 120 having a U-shaped cross section. The lower silicon substrate 122 comprises a semiconductor laser 124 and a waveguide 126. The laser 124 is fabricated by means of a semiconductor process. The waveguide 126 has a Bragg reflector or a prism at one end and is designed for emitting a laser beam from the laser 124 at a predetermined angle. The waveguide 126 is formed, for example, by repeating deposition/etching processes on the silicon substrate 122. The laser beam emitted from the waveguide 126 is reflected by the reflection mirror 116 on the cantilever 112. The beam reflected by the mirror 116 is further reflected by a first reflection surface 128 on the lower silicon substrate 122 and then by a second reflection surface 130 provided on the intermediate block 120. Finally, the beam is made incident on a photodetector 132 provided on the lower silicon substrate 122.

Figure 12:
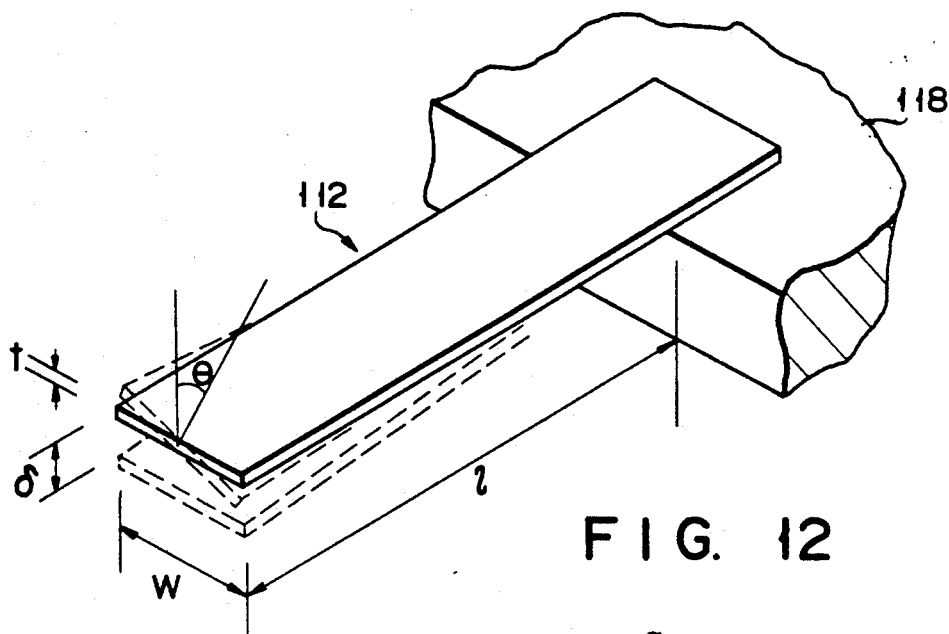
FIG. 12 is a view for illustrating the size of the cantilever in FIG. 11.

When the cantilever 112 is displaced by force F by a degree of $\delta$, as shown in FIG. 12, the displacement $\delta$ is given by $$\delta = 4\, l^3 F / t w^3 E \tag{1}$$

where l = the length of the cantilever 112, t = the thickness of the cantilever, w = the width of the cantilever, and E = the vertical elastic coefficient of the cantilever.

Figure 13:
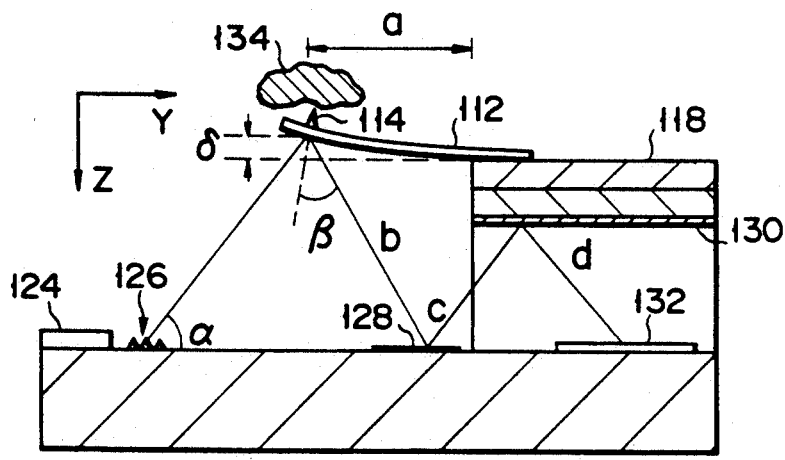
FIG. 13 is a view for illustrating the displacement of the cantilever in FIG. 11 due to an inter-atomic force.

When the cantilever 112 is displaced by $\delta$, the position of the main laser beam illuminated on the photodetector 132 moves by $\Delta y$ accordingly. In FIG. 13, a denotes a distance between the proximal end of the cantilever 112 and the position of the probe 114, b denotes the length of a light path (in a y-z plane) between the reflection mirror 116 and the first reflection surface 128, c denotes the length of a light path between the first reflection surface 128 and the second reflection surface 130, and d denotes the length of a light path between the second reflection surface 130 and the photodetector 132. The amount of movement $\Delta y$ and the distance and lengths a, b, c and d have the following relationship:

$$\delta y \propto \delta(a+b+c+d)/a,$$

Figure 14:
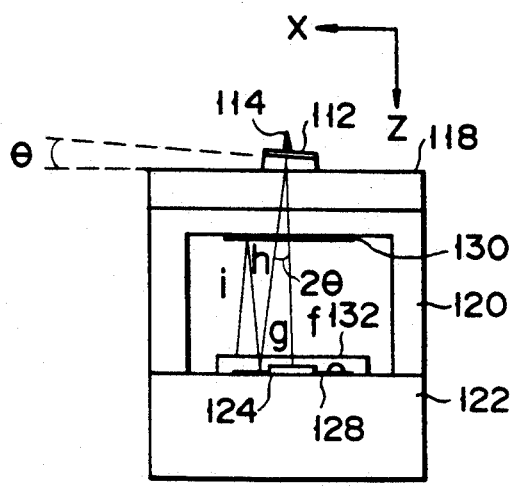
FIG. 14 is a view for illustrating the rotational displacement of the cantilever in FIG. 11 due to a shearing force.

When the cantilever 112 is rotated by $\theta$ by moment load T, the angle $\theta$ is given by $$\theta = 3lT/tw^3 G \tag{2}$$

where G = the lateral elastic coefficient of the cantilever 112. When the cantilever 112 rotates by $\theta$, the position of the main beam incident on the photodetector 132 shifts by $\Delta x$ accordingly. Referring to FIG. 14, the amount of movement $\Delta x$ is given by $$\Delta x = \sin 2\theta(g+h+i) \tag{3}$$

where g = the length of a light path (in an x-z plane) between the reflection mirror 116 and the first reflection surface 128, h = the length of a light path between the first reflection surface 128 and the second reflection surface 130, and i = the length of a light path between the second reflection surface 130 and the photodetector 132.

The amounts of movement $\Delta x$ and $\Delta y$ are detected by the photodetector 132.

The photodetector 132 comprises four light-receiving portions D1, D2, D3 and D4 which generate signals d1, d2, d3 and d4. As is shown in FIG. 15, conventional adders and subtracters are combined to produce signals $S\delta$ and $S\theta$ which are represented by $$S\delta = (d1+d2)-(d3+d4) \tag{3}$$

$$S\theta = (d1-d2)+(d3-d4), \tag{4}$$

The signals $S\delta$ and $S\theta$ are proportional to $\Delta y$ and $\Delta x$. Accordingly, the displacement 6 and rotational angle $\theta$ of the cantilever 112 are found on the basis of signals $S\delta$ and $S\theta$. The signals $S\delta$ and $S\theta$, along with positional signals (x-signal and y-signal) of the probe output from the XY-scanner 131, are supplied to an image forming unit 133 and analyzed to produce an image of the sample surface configuration. The image produced by the image forming unit 133 is displayed on a display 135.

The photodetector 132 is situated in such a position that $S\delta = 0$ is output when the cantilever 112 is displaced, for example, by $\delta_0$. In other words, in the design process, the relationship between the interatomic force and the probe/sample distance which is illustrated in FIG. 16, is taken into account. For example, the displacement $\delta_0$ of the employed cantilever 112 in relation to the force acting at a distance A is found in advance by using equation (1). Thus, the photodetector 132 is situated in such a position that $S\delta = 0$ is output when the cantilever 112 is displaced by $\delta_0$.

The measuring operation of the above apparatus will now be described. When measurement is carried out, the entire apparatus is moved in the Z-direction by means of a rough movement mechanism (not shown) attached to the lower silicon substrate 122. Thereby, the probe 114 attached to the cantilever 112 is approached to the sample 134. While the probe 114 is approached to the sample 134, a laser beam is emitted from the semiconductor laser 124. When the output $S\delta$ has become 0, the approaching of the probe 114 is stopped. As a result, the cantilever 112 is stopped in the state in which it is displaced by $\delta_0$.

Subsequently, the entire apparatus 110 is moved in XY-directions by the XY-scanner 131 so as to enable the probe 114 to scan the surface of the sample 134. When the probe 114 is moved, the distance between the probe 114 and the sample 134 varies in accordance with the surface configuration of the sample 134, and the interatomic force acting on the probe 114 varies accordingly. Consequently, the displacement of the cantilever 112 varies from $\delta_0$. As has been described above, the displacement of the cantilever 112 varies the reflection angle $\beta$ of the laser beam from laser 124 at the reflection mirror 116. The displacement of the cantilever 112 is detected as an output signal $S\delta$ from the photodetector 132 which is given by equations (1) and (3). When a shearing force acts on the probe 114, the cantilever 112 is displaced in the rotational direction. The rotational angle of the cantilever 112 is detected as an output signal $S\theta$ from the photodetector which is given by equations (2) and (4). The signals $S\delta$ and $S\theta$, as well as output signals (x-signal and y-signal) from the XY-scanner 131 which represent the position of the surface of the sample 134, are supplied to the image forming unit 133; thus, an image representing the surface configuration of the sample 134 is formed. The formed image is displayed on the display 135.

In this embodiment, the probe 114 is designed to operate within a region of attractive force. Thus, the cantilever 112 is normally displaced if the unevenness of the sample surface is within a range of ± about 0.2 nm from position A. If the probe 114 is distant from the sample 134 by 0.8 nm or more, the cantilever 112 stops in a parallel position and is not displaced. If the probe 114 is close to the sample at a distance of 0.5 nm or less, the probe/sample distance does not exactly correspond to the interatomic force.

Figure 17:
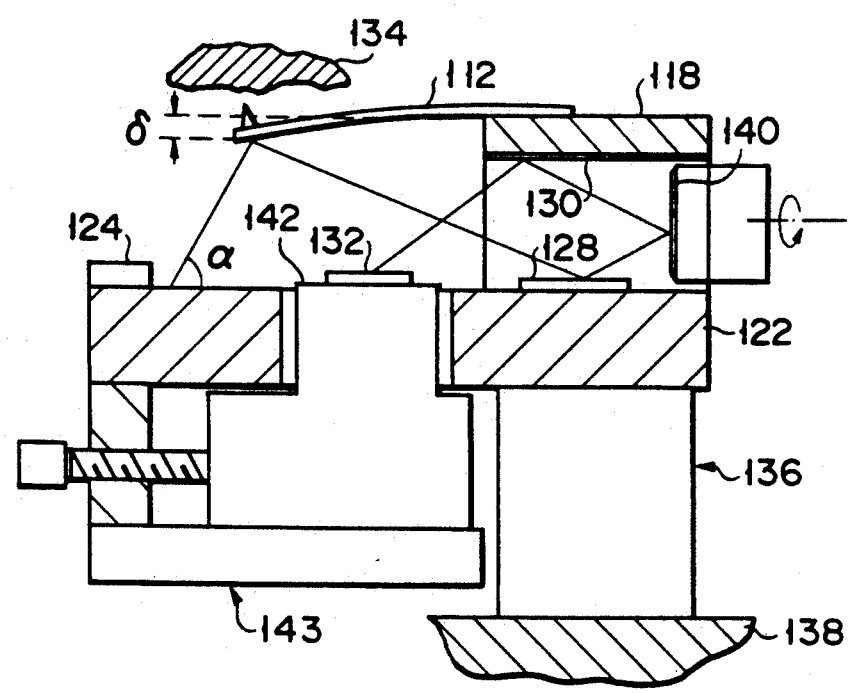
FIG. 17 shows a sixth embodiment of the atomic probe microscope according to the invention.
Figure 18:
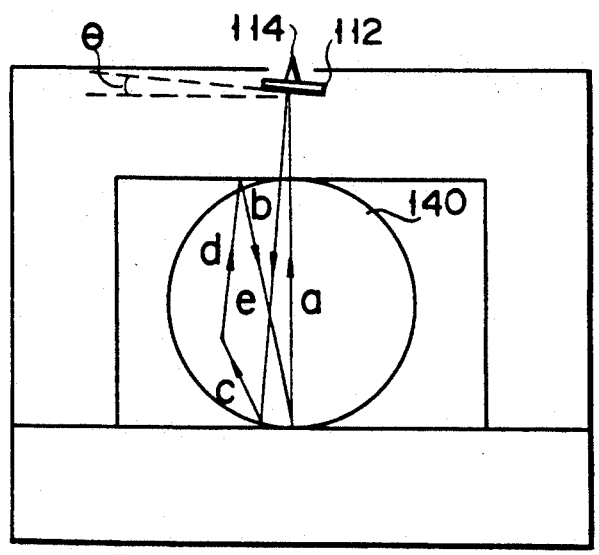
FIG. 18 is a view for illustrating the light path at the time the cantilever in FIG. 17 has rotated by an angle $\theta$.
Figure 19:
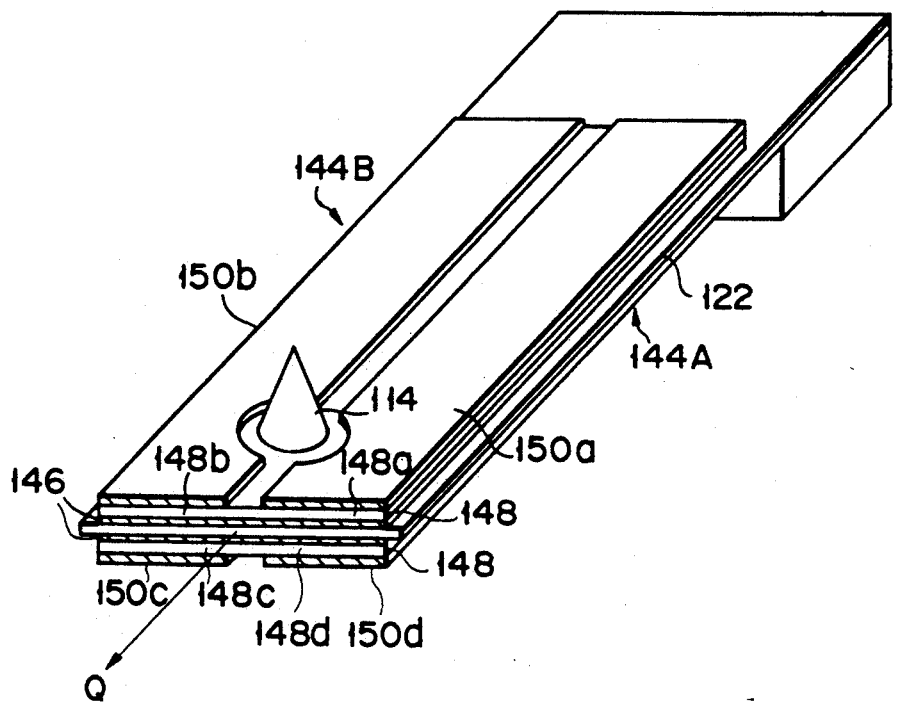
FIG. 19 is a perspective view showing the cantilever of FIG. 17.

Referring now to FIGS. 17 to 19, a sixth embodiment of the atomic probe microscope of the present invention will be described.

In the sixth embodiment, the lower silicon substrate 122 is fixed to a rough movement device 138 with a piezoelectric actuator 136 interposed. The actuator 136 is a conventional z-directional fine movement device used in an STM, etc. A rotational mirror 140 is provided on a light path of a laser beam emitted from the semiconductor laser 124. The mirror 140 is rotatable about the y-axis and has a mirror surface slightly inclined with respect to a plane vertical to the y-axis. A fine movement device 144 having a y-directionally movable stage 142 is attached to the lower silicon substrate 122. A photodetector 132 is fixed on the stage 142 which is substantially on a level with the upper surface of the lower silicon substrate 122.

The cantilever 112 used in this embodiment has two pairs of bimorphs 144A and 144B extending in the longitudinal direction, as shown in FIG. 19. This type of bimorph 144A, 144B was proposed by C. F. Quate et al. of Stanford University, and was built in an STM cantilever. The structure and operation of the bimorphs will now be described with reference to FIG. 19. The bimorphs 144A and 144B are formed in the following manner. Al electrodes 146 for grounding are provided on the upper and lower surfaces of the cantilever 112. Piezoelectric layers 148 of ZnO, etc. are formed by deposition on the upper and lower surfaces of the Al electrode 146. Al electrodes 150a, 150b, 150c and 150d for driving, which are divided at the center, are deposited on the upper and lower surfaces of the piezoelectric layers 148. In this structure, one bimorph 144A is constituted between the electrodes 150a and 150d, and the other bimorph 144B is constituted between the electrodes 150b and 150c.

The piezoelectric layers 148 covered by the electrodes 150a, 150b, 150c and 150d are denoted, respectively, by numerals 148a, 148b, 148c and 148d. The layers 148a, 148b, 148c and 148d have lengths la, lb, lc and ld. When voltages V1, V2, V1 and V2 (V1>V2) are applied to the electrodes 150a, 150b, 150c and 150d, the lengths of the piezoelectric layers become la=lc>lb=ld. As a result, the bimorph 144A warps downwards, the bimorph 144B warps upwards, and the tip portion of the cantilever 112 rotates about the axis Q in the clockwise (CW) direction. If the intensities of voltages are reversed, i.e. V1<V2, the cantilever 112 rotates in the anticlockwise (ACW) direction. Hereinafter, these rotational mode controls are referred to as "CW rotational mode control" and "ACW rotational mode control".

On the other hand, if voltages V1, V1, V2 and V2 (V1>V2) are applied to the electrodes 150a, 150b, 150c and 150d, the lengths of the piezoelectric layers become la=lb>lc=ld, and the tip portion of the cantilever 112 warps downwards. If the intensities of voltages are reversed, i.e. V1<V2, the tip portion of the cantilever 112 warps upwards. These displacement mode controls are referred to as "UP displacement control" and "DOWN displacement control".

The operation of the above apparatus will now be described with reference to FIGS. 17 and 18.

Prior to measurement, the photodetector 132 and rotational mirror 140 are situated in predetermined initial positions. Specifically, the photodetector 132 is situated by means of the fine movement device 143 to such a position that the output $S\delta$ becomes 0 when the probe/sample distance takes the value at point C in FIG. 16 and the cantilever 112 is displaced by $\delta_0$. This positioning is carried out based on a predetermined scale (not shown). In addition, the angle of the rotational mirror 140 is determined according to a predetermined scale (not shown) so that the output $S\theta$ from the photodetector 132 becomes 0 when the probe 114 receives shearing force $T_0$ from the sample 134 and the cantilever 112 rotates by $\theta_0$.

In measurement, the probe 114 provided at the tip portion of the cantilever 112 is approached, along with the lower silicon substrate 122, to the sample 134 by means of the rough movement device 138 attached to the piezoelectric actuator 136. While the probe 114 is being approached to the sample 134, the output $S\delta$ from the photodetector 132 is monitored, and, when the output $S\delta$ has become 0, the rough movement device 138 is stopped. In this case, a repulsive force corresponding to point C in FIG. 16 acts on the probe 114 and the cantilever 112 shifts downwards by $\delta_0$.

Then, the probe 114 is scanned in the X-direction by means of a conventional XY-scanning device (not shown). The probe/sample distance varies in accordance with the surface configuration of the sample 134. Accordingly, the inter-atomic force acting on the probe 114 varies and also the amount of displacement of the cantilever 112 varies. As the amount of displacement of the cantilever 112 varies, the location at which the laser beam is incident on the photodetector 132 is altered so that an output $S\delta$ ($\neq 0$) is generated. The output $S\delta$ is input to a Z-servo circuit (not shown). The output from the Z-servo circuit is input to the piezoelectric actuator 136 to carry out servo control so as to keep the displacement $\delta_0$ constant. Accordingly, an image of the surface configuration of the sample 134 is formed on the basis of the output signal from the Z-servo circuit.

On the other hand, during the scanning, the probe 114 receives a shearing force T from the sample 134 and the cantilever 112 is rotated. The rotational displacement of the cantilever 112 is detected as output $S\theta$ from the photodetector 132. The output $S\theta$ is initialized to have the value "0" when the probe 114 receives the shearing force $T_0$. Accordingly, when the shearing force having a value different from $T_0$ is exerted to the probe 114, the output $S\theta$ ($\neq 0$) is generated. The signal $S\theta$ is input to the $\theta$ servo circuit (not shown) connected to the bimorphs 144A and 144B.

In this embodiment, the operation range of the probe 114 is set to the region of repulsive force; however, it can be set to the region of attractive force. In addition, since the displacement of the cantilever 112 is servo-controlled in the Z-direction to value $\delta_0$, the cantilever 112 can operate in a wide range, unlike the above-described embodiment. It is also possible to adjust, in the initializing process, the rotational mirror 140 so as to set the output $S\delta$ at 0, by controlling in advance the bimorphs 144A and 144B in the rotational mode and rotating and fixing the probe 114 such that the side surface of the probe 114 becomes vertical to the sample surface.

Figure 20:
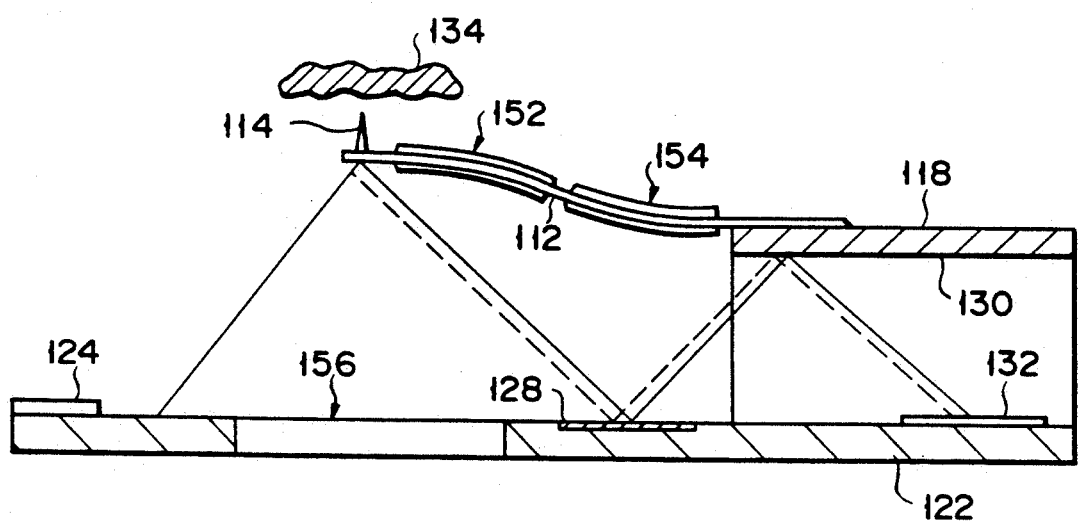
FIG. 20 shows a seventh embodiment of the atomic probe microscope of the present invention.

A seventh embodiment of the present invention will now be described with reference to FIG. 20, in comparison to the sixth embodiment.

The cantilever 112 has two bimorphs 152 and 154 extending in the longitudinal direction. Each of the bimorphs 152 and 154 has a structure as shown in FIG. 19. Each bimorph is connected to a driving circuit (not shown) for warp mode control. One of the driving circuits is provided with an input Id for controlling the reflection angle of the reflection mirror 116 of cantilever 112 and an input It for the rotational mode control. The other driving circuit is provided with an input Ic for carrying out the DOWN displacement control to a degree corresponding to the degree of the UP displacement control which is carried out on the one driving circuit. The input Ic is connected to the output Sδ from the photodetector 132. While the reflection angle of the reflection mirror 116 is kept constant, the probe 114 is moved in the Z-direction. The input It is connected to the output Sθ of the photodetector 132 via the aforementioned θ servo circuit. Part of the lower silicon substrate 22 situated below the probe 114 is provided with an opening 156, thereby making it possible to optically observe the sample by use of an objective lens system.

The operation of the above embodiment will now be described. When the probe 114 is approached to the sample 134 by use of a rough movement device (not shown), an inter-atomic force acts between the probe 114 and the sample 134. The cantilever 112 is displaced upwards, for example, by δi₀, and the photodetector 132 outputs signal Sδ. At this time, the rough movement device is stopped. The probe 114 is moved in the XY-directions by means of an XY-scanning device (not shown) and the Z-directional servo control is effected. When the probe 114 moves and the distance between the probe 114 and the surface of 134 decreases, the attractive force acting on the probe 114 increases and the cantilever 112 is displaced further upwards. The bimorph 152 is subjected to the DOWN displacement control, and the bimorph 154 is subjected to the UP displacement control. Thus, the reflection angle of the reflection mirror is restored to the original angle, and the inter-atomic force acting on the probe 114 is kept at a predetermined value. On the other hand, when the shearing force T is exerted by the sample 134, the output Sθ is fed to the input Id via the θ servo circuit so that the driving circuit carries out the rotational mode control. If the start point of the servo operation is set to the displacement of the cantilever 112 in accordance with a predetermined inter-atomic force acting on the cantilever 112, the Z-servo circuit and θ servo circuit generate data relating to the configuration of the sample 134 and the shearing force when a predetermined inter-atomic force acts.

An eighth embodiment of the invention will now be described with reference to FIGS. 21 and 22. In FIGS. 21 and 22, numeral 158 denotes a conventional cylindrical piezoelectric actuator attached to a lower silicon substrate 122. Part of the side surface of the actuator 158 is provided with an opening 160 through which a laser beam is introduced. An intermediate block 120 having a photodetector 132 is provided within the actuator 158. A cantilever 112 having a probe 114 and a reflection mirror 116 at its end portion is provided on an upper silicon substrate 118 formed at the upper part of the actuator 132.

The cylindrical piezoelectric actuator 158 has a common electrode on its inner wall, and an electrode situated on its outer wall and divided into four parts along the longitudinal axis of the actuator 158. The cantilever 112 can be displaced in the θ-direction, δ-direction and Z-direction by a conventional electrode voltage applying method. This function corresponds to the function of the bimorphs 144A and 144B and piezoelectric actuator 136 in the above-described embodiment. The cylindrical piezoelectric actuator may be replaced by four rod-shaped or plate-shaped actuators.

The present invention is not limited to the above embodiments, and various modifications and changes may be made without departing from the subject matter of the present invention. For example, the material of the cantilever is not limited to silicon, and other suitable material may be selected according to the specifications of the apparatus. In the above embodiments, the cantilever was manufactured by etching a Si wafer; however, it may be made of SiO₂, Si₃N₄, polysilicon, or Al by combining a film deposition technique such as CVD, vapor deposition or sputtering with an etching technique. Alternatively, a sufficiently thin phosphor bronze foil made by a conventional method may be used. In this case, the probe may be formed by attaching tungsten, indium, platinum, or diamond particles. Although the above embodiments are directed to atomic force microscopes, the present invention is, of course, applicable to other probe microscopes, e.g. magnetic force microscopes or tunneling microscopes.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. An atomic probe microscope comprising:
    a probe with a pointed tip;
    a lever element supporting the probe at a portion thereof;
    first reflection means provided on a portion of the lever element which is located opposite to the portion at which the probe is supported;
    a semiconductor laser having a first cleavage plane constituting second reflection means, a second cleavage plane including a light transmissive film, and a Fabry-Perot resonator formed between said first and second reflection means;
    distance detecting means for detecting a distance between the tip of the probe and the surface of a sample on the basis of an output from the semiconductor laser;
    moving means for moving the probe and the sample relative to each other, thereby enabling the probe to scan the surface of the sample;
    image forming means for forming an image of the surface of the sample on the basis of an output from said distance detecting means and an output from said moving means; and
    display means for displaying the formed image.

2. The atomic probe microscope according to claim 1, wherein said second cleavage plane of said semiconductor laser is coated with an anti-reflection film.

3. The atomic probe microscope according to claim 1, further comprising adjusting means for adjusting a distance between the first reflection means on the lever element and the second reflection means.

4. The atomic probe microscope according to claim 1, wherein said distance detecting means includes variation detecting means for detecting a variation in the output from the semiconductor laser.

5. The atomic probe microscope according to claim 4, wherein said variation detecting means includes a photodetector for receiving light from the semiconductor laser, and a detector for receiving an output from the photodetector.

6. The atomic probe microscope according to claim 5, further comprising an etalon between the second reflection means of the semiconductor laser and the photodetector, said etalon selectively transmitting light of a specified wavelength.

7. The atomic probe microscope according to claim 5, further comprising control means for controlling the distance between the tip of the probe and the surface of the sample, said control means including a piezoelectric element for adjusting the distance between the tip of the probe and the surface of the sample, and a servo, circuit for receiving the output from the detector and for controlling the piezoelectric element so as to cancel the variation in the output from the semiconductor laser.

8. The atomic probe microscope according to claim 4, wherein said variation detecting means comprises a monitor element formed integrally with the semiconductor laser.

9. The atomic probe microscope according to claim 1, wherein said second reflection means comprises a Bragg grating optically coupled to the cleavage planes of the semiconductor laser.

10. The atomic probe microscope according to claim 1, further comprising control means for controlling the distance between the tip of the probe and the surface of the sample, said control means carrying out servo control on the basis of the output from the distance detecting means.

11. The atomic probe microscope according to claim 1, wherein said lever element supports the probe at an end portion thereof.

12. An atomic probe microscope comprising:
a probe with a pointed tip;
a lever element supporting the probe at a tip portion thereof;
a grating reflection element provided on a portion of the lever element which is located opposite to the tip portion at which the probe is supported;
an optical waveguide path extending over the lever element and situated adjacent to the grating reflection element;
a reflection element situated opposite to and adjacent to the grating reflection element;
a semiconductor laser having reflection means, coupled optically to said waveguide path, and arranged to form a Fabry-Perot resonator between said reflection element and said reflection means;
distance detecting means for detecting a distance between the tip of the probe and the surface of a sample on the basis of an output from the semiconductor laser;
moving means for moving the probe and the sample relative to each other, thereby enabling the probe to scan the surface of the sample;
image forming means for forming an image of the surface of the sample on the basis of an output from said distance detecting means and an output from said moving means; and
display means for displaying the formed image.

13. The atomic probe microscope according to claim 12, wherein an active layer of said semiconductor laser and the waveguide path are arranged on a single plane.

14. The atomic probe microscope according to claim 13, wherein said distance detecting means comprises variation detecting means for detecting a variation in the output from the semiconductor laser, and adjusting means for adjusting a distance between said reflection element and said reflection means in accordance with this variation.

15. The atomic probe microscope according to claim 14, wherein said variation detecting means comprises a photodetector for receiving light from the semiconductor laser and a detector for receiving an output from the photodetector, and wherein said adjusting means comprises a piezoelectric element for adjusting the distance between the tip of the probe and the surface of the sample, and a servo circuit for receiving an output from the detector and for controlling the piezoelectric element so as to cancel the variation in the output from the semiconductor laser.

16. An atomic probe microscope comprising:
a probe with a pointed tip;
a lever element supporting the probe at a tip portion thereof;
a reflection surface provided on a portion of the lever element which is located opposite to the tip portion at which the probe is supported;
a light source for emitting a laser beam;
irradiation means for irradiating the laser beam from the light source on the reflection surface;
moving means for moving the probe and a sample relative to each other, thereby enabling the probe to scan the surface of the sample;
detection means for receiving the laser beam reflected by the reflection surface and for detecting the movement of the reflection surface of the lever element and an amount of rotation of the tip portion of the lever element;
calculating means for generating data relating to the surface configuration of the sample and a shearing force acting on the probe, on the basis of an output from the detection means;
image forming means for forming an image of the surface of the sample on the basis of an output from said calculating means and an output from said moving means; and
display means for displaying the formed image.

17. The atomic probe microscope according to claim 16, wherein said detection means includes a photodetector having light-receiving regions arranged in a matrix of two rows and columns and means for calculating an output from the light-receiving regions.

18. The atomic probe microscope according to claim 17, wherein said calculating means adds the outputs from the light-receiving regions belonging to the same row with respect to each of the two rows and carries out a subtraction of the added outputs of the two rows, and also adds the outputs from the light-receiving regions, belonging to the same column with respect to each of the two columns and carries out a subtraction of the added outputs of the two columns.

19. The atomic probe microscope according to claim 16, further comprising angle adjusting means for adjusting an angle of displacement of the lever element.

20. The atomic probe microscope according to claim 19, wherein said angle adjusting means includes control means for controlling and adjusting the rotation of the top portion of the lever element.

21. The atomic probe microscope according to claim 16, wherein said angle adjusting means comprises a bimorph piezoelectric element formed on the lever element.

22. The atomic probe microscope according to claim 16, wherein said angle adjusting means comprises a piezoelectric element having one end fixed and having another end portion connected to the lever element.

23. An atomic probe microscope comprising:
a probe with a pointed tip;
a lever element supporting the probe;
a reflection surface provided on a portion of the lever element which is located opposite to a portion at which the probe is supported;
a light source for emitting a laser beam to be incident on the reflection surface;
photodetector means for receiving the laser beam reflected by the reflection surface and for detecting a displacement of the lever element on the basis of a distance by which the laser beam incident on the photodetector means moves responsive to the displacement of the lever element; and
lengthening means for lengthening the optical path between the reflection surface and the photodetector means by further reflecting, at least once, the laser beam reflected by the reflection surface in a region between the reflection surface and the photodetector means.

24. The atomic probe microscope according to claim 23, wherein said photodetector means includes position adjusting means for adjusting a position at which the laser beam is received.

25. The atomic probe microscope according to claim 23, wherein said lengthening means includes adjusting means for adjusting a reflection angle of the reflection means.

26. The atomic probe microscope according to claim 23, wherein said lengthening means comprises two parallel reflection surfaces.

* * * * *